No. 734,514.

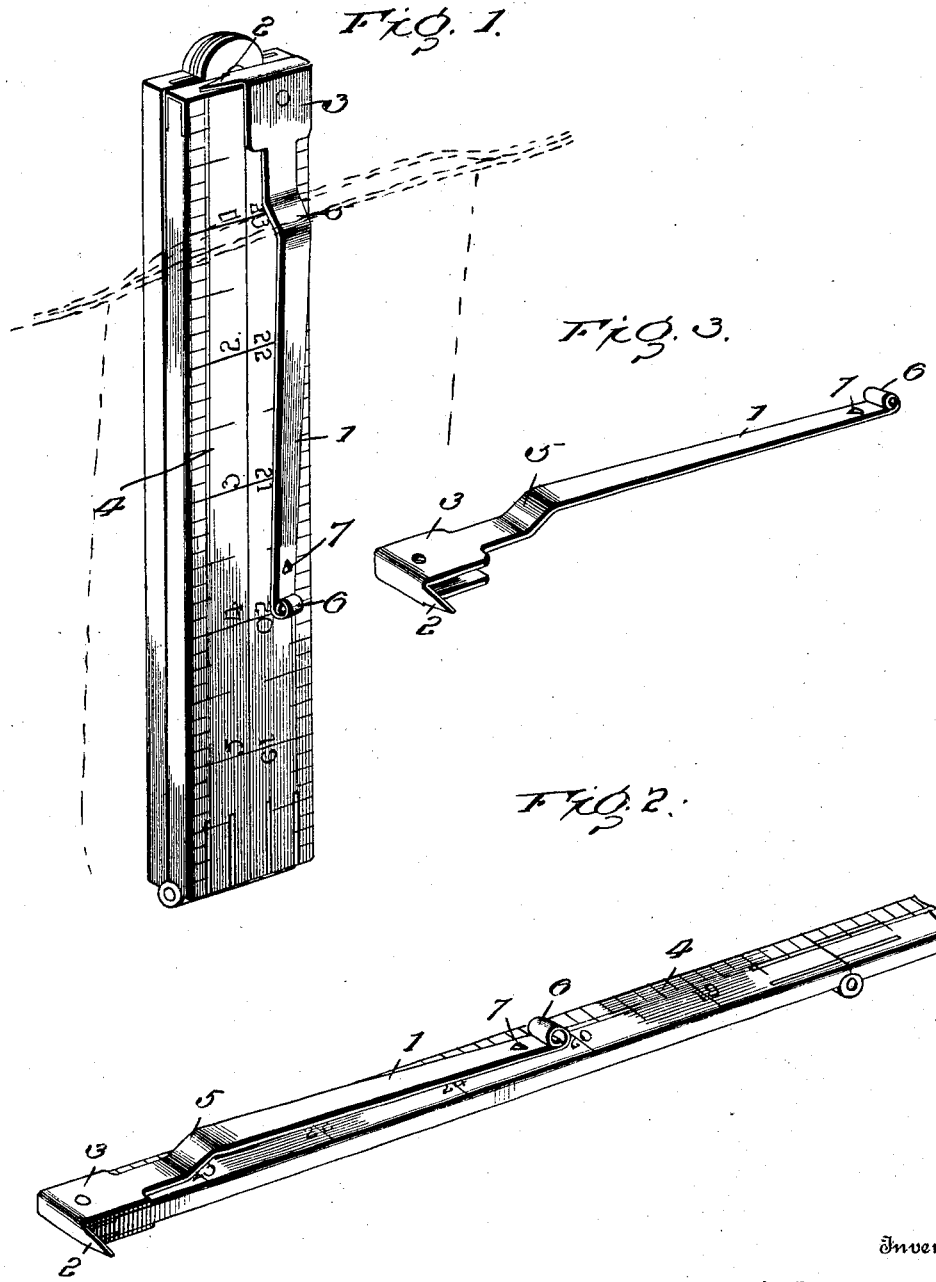

Patented July 28, 1903.

UNITED STATES PATENT OFFICE.

FRANK ELMER CLARK, OF INDEPENDENCE, KANSAS.

CARPENTER'S RULE.

SPECIFICATION forming part of Letters Patent No. 734,514, dated July 28, 1903.

Application filed April 14, 1903. Serial No. 152,567. (No model.)

*To all whom it may concern:*

Be it known that I, FRANK ELMER CLARK, a citizen of the United States, residing at Independence, in the county of Montgomery and State of Kansas, have invented certain new and useful Improvements in Carpenters' Rules, of which the following is a specification.

The ruler commonly used by carpenters, joiners, and mechanics generally is usually carried in the pocket for convenience and to be within reach at all times. Such rule is freely used for marking when laying off work, the end forming a scratch-point for indicating the measures when running the rule along a given line. The rule frequently slips from the pocket and is lost, causing annoyance, vexation, loss of time, and expense, and after repeated use the corner of the rule becomes worn and cannot be used for scratching, besides detracting from the appearance of the article.

The aforenoted objections are obviated by the present invention, which provides a scratch-awl and a holder, the latter retaining the rule in the pocket against accidental displacement, the awl and holder preferably forming parts of the same attachment.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a carpenter's rule embodying the invention. Fig. 2 is a perspective view of the end portion of the rule provided with the holder and scratch-awl. Fig. 3 is a perspective view of the attachment.

Corresponding and like parts are referred to in the following description and indicated in all the views of the drawings by the same reference characters.

The rule illustrated is of ordinary construction, such as generally used by carpenters and mechanics, and is composed of folding sections. To one end of the rule is fitted the attachment comprising spring-holder 1 and scratch-awl 2, same constituting parts of a single piece of material. A clip 3 is provided at one end of the holder and is adapted to embrace opposite sides of the end of rule 4. The scratch-awl 2 projects from the inner end of clip 3, so as to extend in front of the opposite end of the rule when the latter is folded, whereby said scratch-awl is protected from injurious contact with the person or clothing. The clip 3 may replace the usual metal protector at one end of the rule or may be so formed as to admit of the attachment being readily applied to rules already upon the market. Spring-holder 1 extends lengthwise of the rule and is provided with an offset 5 near its outer end to accommodate the thickness of material constituting the pocket of the overalls, trousers, or the like commonly receiving the rule. The free end of the holder terminates in roll 6, which constitutes a finger-piece and also facilitates the entrance of the upper portion of the pocket into the space formed between the rule and holder when thrusting the rule into the pocket. A point or spur 7 projects inward from spring-holder 1 near its free end and is adapted to engage with the pocket, so as to prevent casual displacement of the rule, thereby supplementing the clamping action of the holder 1. This point or spur 7 is preferably an integral part of the holder and is formed by pressing or punching a part therefrom.

The attachment may be constructed of any suitable material, brass being preferred, as it is not affected by moisture and is not as readily corroded as iron or steel. The attachment is fitted to the rule by slipping clip 3 over the end thereof and riveting same thereto.

The attachment is so constructed and applied as to occupy the outermost position when the rule is folded and having scratch-awl 2 overlapping the opposite end, as indicated most clearly in Fig. 1.

Having thus described the invention, what is claimed as new is—

1. In combination with a carpenter's rule, an attachment fitted to an end thereof and comprising a scratch-awl and a holder, the latter adapted to prevent casual displacement of the rule when carried in the pocket, substantially as set forth.

2. In combination with a carpenter's rule, an attachment applied thereto and comprising a scratch-awl protected by an end of the rule when the latter is folded, and a spring-holder extending lengthwise of the rule and occupying a position at one side thereof, substantially as described.

3. In combination with a carpenter's rule, an attachment fitted thereto and comprising a clip embracing opposite sides of an end portion of the rule, a scratch-awl extended from the outer end of the clip to overlap the opposite end of the rule when the latter is folded, and a spring-holder forming an extension of a side of the clip, substantially as described.

In testimony whereof I affix my signature in presence of two witnesses.

FRANK ELMER CLARK. [L. S.]

Witnesses:
RILEY WOOLDRIDGE,
W. P. LYON.